(12) United States Patent
Tokunaga et al.

(10) Patent No.: US 10,953,890 B2
(45) Date of Patent: Mar. 23, 2021

(54) STEERING TORQUE ESTIMATING DEVICE

(71) Applicant: KAWASAKI JUKOGYO KABUSHIKI KAISHA, Kobe (JP)

(72) Inventors: Hisato Tokunaga, Nishinomiya (JP); Kazuhiro Ichikawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 230 days.

(21) Appl. No.: 16/343,247

(22) PCT Filed: Oct. 19, 2016

(86) PCT No.: PCT/JP2016/080961
§ 371 (c)(1),
(2) Date: Apr. 18, 2019

(87) PCT Pub. No.: WO2018/073913
PCT Pub. Date: Apr. 26, 2018

(65) Prior Publication Data
US 2019/0248376 A1    Aug. 15, 2019

(51) Int. Cl.
*B60W 40/10* (2012.01)
*B62J 99/00* (2020.01)
(Continued)

(52) U.S. Cl.
CPC .............. *B60W 40/10* (2013.01); *B62J 99/00* (2013.01); *B60W 2300/36* (2013.01); *B60W 2510/202* (2013.01); *B60W 2520/18* (2013.01); *B60W 2520/20* (2013.01); *B60W 2520/28* (2013.01); *B62J 45/20* (2020.02); *B62J 45/40* (2020.02); *B62J 45/4151* (2020.02); *B62K 21/00* (2013.01)

(58) Field of Classification Search
CPC ............. B60W 40/10; B60W 2300/36; B60W 2510/202; B60W 2520/18; B60W 2520/20; B60W 2520/28; B62J 99/00; B62J 45/20; B62J 45/40; B62J 45/4151; B62K 21/00
See application file for complete search history.

(56) References Cited

U.S. PATENT DOCUMENTS

2009/0139793 A1    6/2009    Suzuki
2013/0066522 A1    3/2013    Haas et al.
(Continued)

FOREIGN PATENT DOCUMENTS

JP    2009132271 A    6/2009
WO   2010023668 A1   3/2010

OTHER PUBLICATIONS

Slimi, H. et al., "Motorcycle Speed Profile in Cornering Situation," Proceedings of the American Control Conference—Aug. 2010, Baltimore, MD, 7 pages.

*Primary Examiner* — Mary Cheung
(74) *Attorney, Agent, or Firm* — Alleman Hall Creasman & Tuttle LLP

(57) ABSTRACT

A steering torque estimating device which estimates steering torque which is torque provided to a steering axis due to a vehicle body behavior, in a vehicle including a front wheel as a steered wheel, the vehicle being configured to turn in a bank state in which a vehicle body is tilted around a forward-rearward axis, includes a torque estimating section which estimates the steering torque based on a change over time of a bank angle and a rotational speed of the front wheel.

9 Claims, 6 Drawing Sheets

(51) Int. Cl.
*B62K 21/00* (2006.01)
*B62J 45/20* (2020.01)
*B62J 45/40* (2020.01)
*B62J 45/415* (2020.01)

(56) References Cited

U.S. PATENT DOCUMENTS

2013/0214503 A1\* 8/2013 Chiuppani ............... B62K 5/10
                                                             280/124.103
2013/0238206 A1 9/2013 Lemejda
2016/0280319 A1\* 9/2016 Dodds ................... B62M 29/02

\* cited by examiner

STEERING TORQUE ESTIMATING DEVICE

TECHNICAL FIELD

The present invention relates to a device which estimates steering torque in a vehicle which turns in a bank state in which a vehicle body is tilted (inclined) around a forward-rearward axis.

BACKGROUND ART

Patent Literature 1 discloses a system which detects steering torque from a steering torque sensor.

CITATION LIST

Patent Literature

Patent Literature 1: Japanese Laid-Open Patent Application Publication No. 2009-132271

SUMMARY OF INVENTION

Technical Problem

In the above-described system, the torque sensor is attached on the vehicle body. Since components of the vehicle increase, manufacturing cost increases. In addition, since a sensor space is necessary, design and manufacture of constituents which are in the vicinity of a head pipe become complex.

In view of the circumstances, an object of the present invention is to accurately estimate steering torque by calculations in a vehicle which turns in a state in which a vehicle body is tilted around a forward-rearward axis.

Solution to Problem

According to an aspect of the present invention, there is provided a steering torque estimating device which estimates steering torque which is torque provided to a steering axis due to a vehicle body behavior, in a vehicle including a front wheel as a steered wheel, the vehicle being configured to turn in a bank state in which a vehicle body is tilted around a forward-rearward axis, the steering torque estimating device comprising: a torque estimating section which estimates the steering torque based on a change over time of a bank angle and a rotational speed of the front wheel.

The torque estimating section may estimate the steering torque based on a braking force applied to the front wheel.

The torque estimating section may estimate the steering torque based on a front wheel vertical force which is a force applied in a vertical direction from a ground surface to the front wheel.

The torque estimating section may estimate the steering torque based on a front wheel lateral force which is a force applied in a lateral direction from a ground surface to the front wheel.

The torque estimating section may estimate the steering torque based on a slip angle which is a deviation angle of a direction of the front wheel with respect to a moving direction of the vehicle body.

The torque estimating section may estimate the steering torque based on a distance from a location at which a force applied to the front wheel is generated, to the steering axis, the distance being defined based on a bank angle.

According to another aspect of the present invention, there is provided a steering torque estimating device which estimates steering torque which is torque provided to a steering axis due to a vehicle body behavior, in a vehicle including a front wheel as a steered wheel, the vehicle being configured to turn in a bank state in which a vehicle body is tilted around a forward-rearward axis, the steering torque estimating device comprising: a torque estimating section which estimates the steering torque based on a force applied from a ground surface to the front wheel, and a distance from a location at which the force applied to the front wheel is generated, to the steering axis, the distance being defined based on a bank angle.

According to another aspect of the present invention, there is provided a method of estimating steering torque which is torque provided to a steering axis due to a vehicle body behavior, in a vehicle including a front wheel as a steered wheel, the vehicle being configured to turn in a bank state in which a vehicle body is tilted around a forward-rearward axis, the method comprising: estimating the steering torque based on a change over time of a bank angle and a rotational speed of the front wheel.

According to a further aspect of the present invention, there is provided a method of estimating steering torque which is torque provided to a steering axis due to a vehicle body behavior, in a vehicle configured to turn in a bank state in which a vehicle body is tilted around a forward-rearward axis, the method comprising: estimating the steering torque based on a force applied from a ground surface to a front wheel, and a distance from a location at which the force applied to the front wheel is generated, to the steering axis, the distance being defined based on a bank angle.

Advantageous Effects of Invention

In accordance with the present invention, steering torque can be accurately estimated by calculations, in a vehicle which turns in a state in which a vehicle body is tilted (inclined) around a forward-rearward axis.

DESCRIPTION OF EMBODIMENTS

Hereinafter, the embodiment of the present invention will be described with reference to the accompanying drawings. In the description, dotted symbols of Newton's notation are expressed at the right of alphabets, in some cases. The term "steering axis" refers to a rotation axis of a steering handle. Except otherwise noted, the term "wheel" refers to an assembly comprised of a wheel in a narrow sense, including a hub, a rim, and a spoke, and a tire mounted on the rim and configured to contact a ground surface. The term "forward-rearward axis" is a virtual axis line. The forward-rearward axis is defined as an axis line extending in a forward and rearward direction, passing through a ground point of a front wheel (point at which the front wheel is grounded on the ground surface) and a ground point of a rear wheel (point at which the rear wheel is grounded on the ground surface), and being perpendicular (orthogonal) to a vehicle width direction. A "bank angle" is defined as a tilt (inclination) angle of the vehicle body around the forward-rearward axis. In other words, the "bank angle" is defined as tilt (inclination) [deg] of an extension direction of a center line of the vehicle body in the vehicle width direction in a front view, with respect to a direction perpendicular to the ground surface. In a case where the center line of the vehicle body in the vehicle width direction extends in the direction perpendicular to the ground surface, the vehicle body is in an upright state and the bank angle is a zero value [deg]. The "vertical direction", the "forward and rearward direction" and the "lateral direction" are orthogonal to each other. The forward and rearward direction is defined as a direction extending along the forward-rearward axis. The lateral direction is defined as a direction in which an axle extends in a straight-ahead traveling state. The forward and rearward direction and the lateral direction change according to a change in the direction of the vehicle body around a vertical axis.

Figure 1:
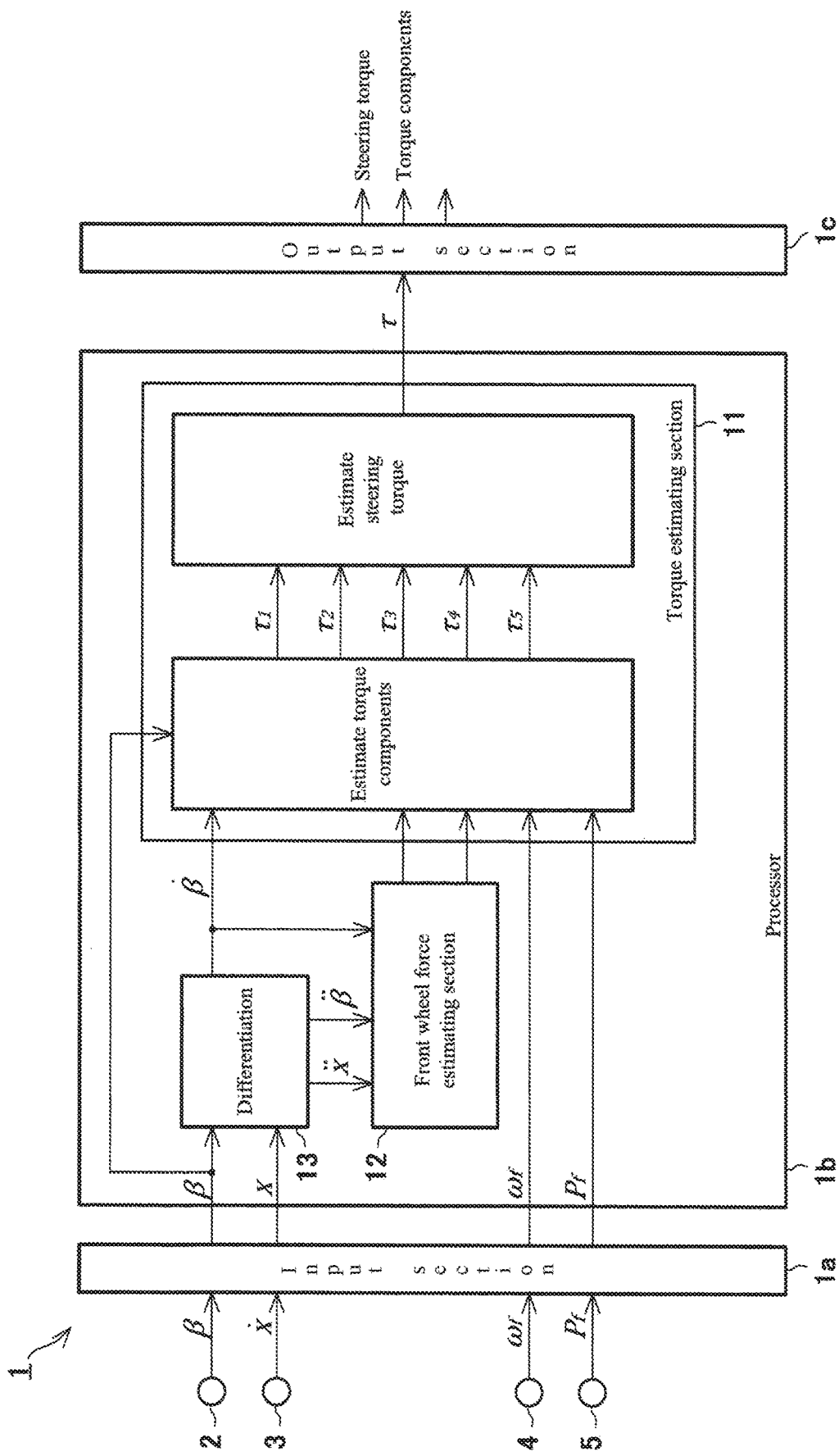
FIG. 1 is a conceptual view showing the configuration of a steering torque estimating device according to an embodiment.

In the present example, the steering torque estimating device 1 of FIG. 1 is mounted in the vehicle. The steering torque estimating device 1 is configured to estimate "steering torque $\tau$" provided to the steering axis due to the behavior of the vehicle body of the vehicle. The "steering torque $\tau$" is defined as torque generated naturally at the steering axis due to the behavior of the vehicle body. Under a situation in which the steering torque $\tau$ caused by the behavior of the vehicle body is generated, a rider can keep a steering angle by operating a handle to provide to the steering axis, inverse torque ($-\tau$ rider) whose absolute value is equal to that of the steering torque $\tau$. In a case where the steering torque $\tau$ and the torque ($-\tau$ rider) provided by the rider are not balanced, the steering angle is changed.

The steering torque estimating device 1 is mounted in the vehicle which turns in a bank state in which the vehicle body is tilted (inclined) around the forward-rearward axis. In the case of straight-ahead traveling, the vehicle travels in the upright state in which the vehicle height direction substantially conforms to a direction (vertical direction) perpendicular to a ground surface.

Motorcycle

As an example of this vehicle, there is a motorcycle. A motorcycle 90 includes one front wheel 91 and one rear wheel as wheels. The rear wheel is a drive wheel, and the front wheel is a driven wheel and a steered wheel. The motorcycle includes a front wheel brake device which brakes the front wheel, and a rear wheel brake device which brakes the rear wheel. These brake devices are hydraulically powered. Each of the brake devices is configured to apply the braking force which is substantially proportional to a brake pressure, to the corresponding wheel. In the present example, the front wheel which is the steered wheel is the driven wheel, and a braking force (engine braking force or a regenerative braking force) which utilizes inertia of a driving power source is not applied.

Figure 2B:
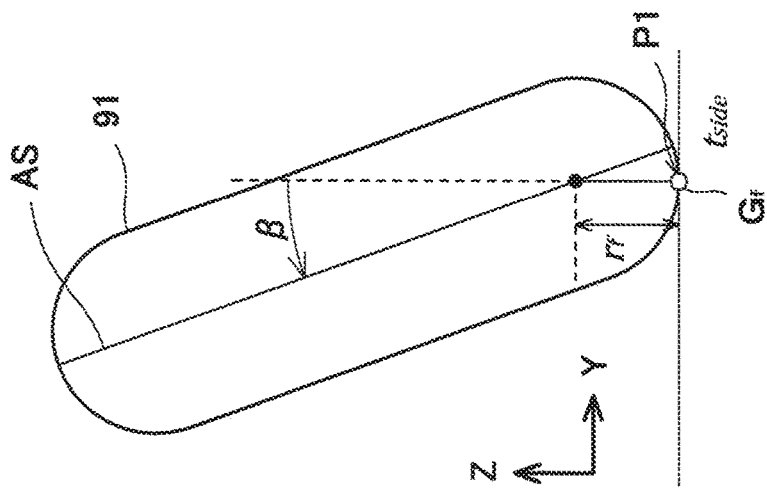
FIG. 2B is a front view of a front wheel in a state in which a vehicle body is in a bank state.
Figure 2A:
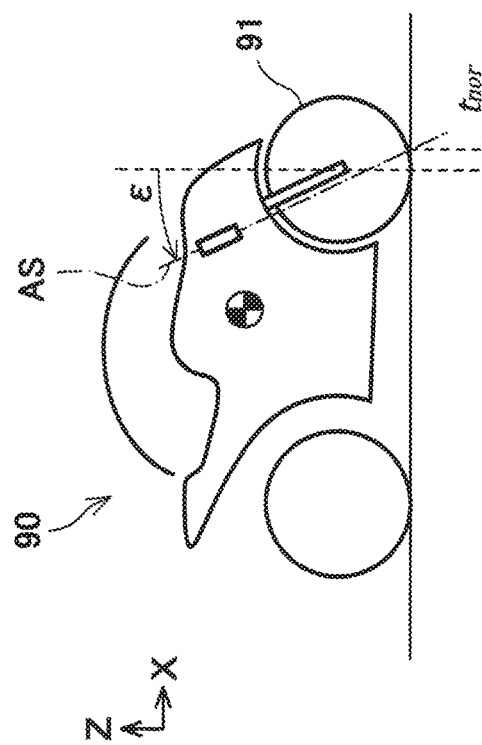
FIG. 2A is a right side view of a motorcycle which is an example of a vehicle for which the steering torque estimating device estimates steering torque.
Figure 2C:
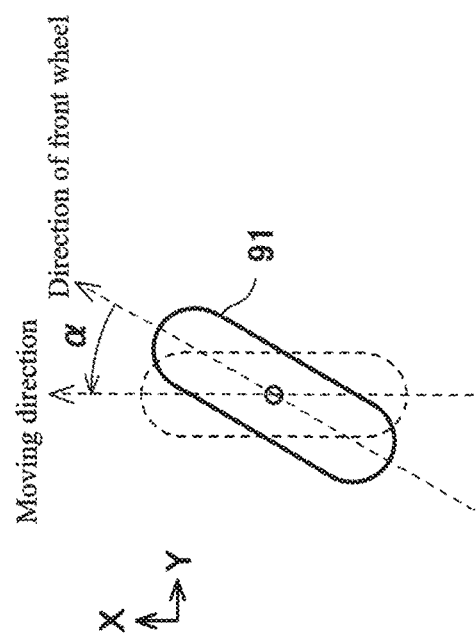
FIG. 2C is a plan view of the front wheel in a state in which a direction of the front wheel is deviated with respect to a moving direction of the vehicle body.

With reference to FIGS. 2A to 2C, parameters associated with the motorcycle will be described in brief. In FIG. 2A, reference symbol $\varepsilon$ is a caster angle. The caster angle $\varepsilon$ is defined as a rearward tilt (inclination) angle of a steering axis AS with respect to the vehicle height direction. The positive value of the caster angle $\varepsilon$ increases as the steering axis AS is slanted rearward. In FIG. 2A, reference symbol $t_{nor}$ is a trail. The trail $t_{nor}$ is defined as a distance in the forward and rearward direction between a front wheel ground point $G_f$ and a ground surface passing point of the steering axis AS.

In FIG. 2B, reference symbol $\beta$ is the above-described bank angle. In FIG. 2B, reference symbol $r_f$ is a crown diameter of the front wheel (front wheel crown diameter). The front wheel crown diameter $r_f$ is a curvature radius of a tread surface of a tire of the front wheel. In the present embodiment, the tread surface has a cross-section with a perfect-semicircular arc shape. In FIG. 2B, reference symbol $t_{side}$ is a side trail. In the bank state of the vehicle body, the ground point $G_f$ is deviated toward a side to which the vehicle body is tilted (to a left side in a case where the vehicle body is tilted to the left), from an intersection P1 of the steering axis AS and the outer peripheral surface (tread surface) of the tire, within a plane perpendicular to the forward-rearward axis. The side trail $t_{side}$ is defined as a distance between this intersection P1 and the ground point $G_f$, in other words, a deviation amount of the steering axis AS with respect to the ground point $G_f$.

In FIG. 2C, $\alpha$ is a slip angle. The slip angle $\alpha$ is defined as an angle formed between the moving direction of the vehicle body and the direction of the front wheel, when viewed in the vertical direction. In other words, the slip angle $\alpha$ is defined as an angle formed between the moving direction of the vehicle body and the direction perpendicular to the front wheel axle, when viewed in the vertical direction. The moving direction of the vehicle body is indicated by a straight line and is a tangential line direction of a turning track in a case where the vehicle is turning.

Steering Torque Estimating Device

The steering torque estimating device 1 includes a storage section which contains therein estimation programs relating to a procedure of a method of estimating the steering torque $\tau$, an input section 1a which receives input values indicating a vehicle state such as the bank angle of the vehicle body, a processor 1b which executes estimation of the steering torque $\tau$ with reference to the input values provided to the input section 1a and the programs stored in the storage section, and an output section 1c which outputs a result (steering torque $\tau$ and its torque components) of calculations performed by the processor 1b to outside. Note that the storage section may temporarily store the input values and intermediate values obtained during execution of the programs based on the input values. As an example of the controller, there is an in-vehicle ECU (electric control unit). The storage section may be configured to pre-store information such as a distance from the center of mass (center of gravity) of the vehicle body to the ground surface, and geometric information of the vehicle body such as the wheel base. Alternatively, these information may be provided to the input section 1a from outside of the steering torque estimating device 1 or may be obtained as the intermediate values by the processor 1b during execution of the estimation programs.

The estimating method used in this steering torque estimating device 1 includes (1) step of obtaining the vehicle body information, (2) step of obtaining the traveling information, (3) step of estimating the steering torque, and (4) step of outputting the estimated steering torque. In the step (1), the parameters which are required for the calculations and other than the traveling state, such as the caster angle ε, are obtained. These parameters are obtained from the sensors located outside the device, from the storage section inside the device, or as intermediate values by the processor 1b within the device. In the step (2), the parameters indicating the traveling state are obtained. The parameters are obtained as the input values from the sensors (in the above example, the sensors 2 to 5) located outside the device or as the intermediate values by the processor 1b within the device. In the step (3), the steering torque τ is estimated based on the information obtained in the step (1) and the step (2). In the step (4), the estimated steering torque obtained in the step (3) is output to outside of the device. The order of the step (1) and the step (2) may be changed as desired.

The steering torque estimating device 1 includes a torque estimating section 11, a front wheel force estimating section 12, and a differentiating section 13, as functional blocks of the processor 1b.

In the present example, the steering torque estimating device 1 receives as the input values, the bank angle β, the vehicle speed (forward-rearward speed of the vehicle body) x•, a front wheel rotational speed $ω_f$, and a front wheel brake pressure $P_f$ of the hydraulic front wheel brake device. The vehicle includes a bank angle sensor 2 which detects the bank angle β, a vehicle speed sensor 3 which detects the vehicle speed, a front wheel speed sensor 4 which detects the front wheel rotational speed $ω_f$, and a front wheel brake pressure sensor 5 which detects the front wheel brake pressure $P_f$, in addition to the steering torque estimating device 1. The bank angle sensor 2 is configured to output the bank angle β of the vehicle body in succession over time so that a change over time of the bank angle β can be known. The vehicle speed sensor 3 is configured to output the vehicle speed x• in succession over time so that a change over time of the vehicle speed x• can be known. The differentiating section 13 is configured to derive an bank angular velocity (first-order temporal differentiation value of the bank angle β) β• which is a change over time of the bank angle β, based on the provided bank angle β. To obtain a front wheel lateral force $F_{yf}$ (described later), a front wheel vertical force $N_f$ (described later), and a front twist moment (intermediate value for estimating the steering torque τ) $M_{zf}$ (described later), the differentiating section 13 may derive a bank angular acceleration rate (second-order temporal differentiation value of the bank angle) β•• which is a change over time of the bank angular velocity β•, based on the provided bank angle β, or may derive a forward-rearward acceleration rate (first-order temporal differentiation value of the vehicle speed x•) x•• which is a change over time of the vehicle speed x•, based on the provided vehicle speed x•.

The torque estimating section 11 estimates a plurality of torque components $τ_1$, $τ_2$ ... of the steering torque τ, and estimates the steering torque τ based on the estimated torque components $τ_1$, $τ_2$ ....

Figure 3:
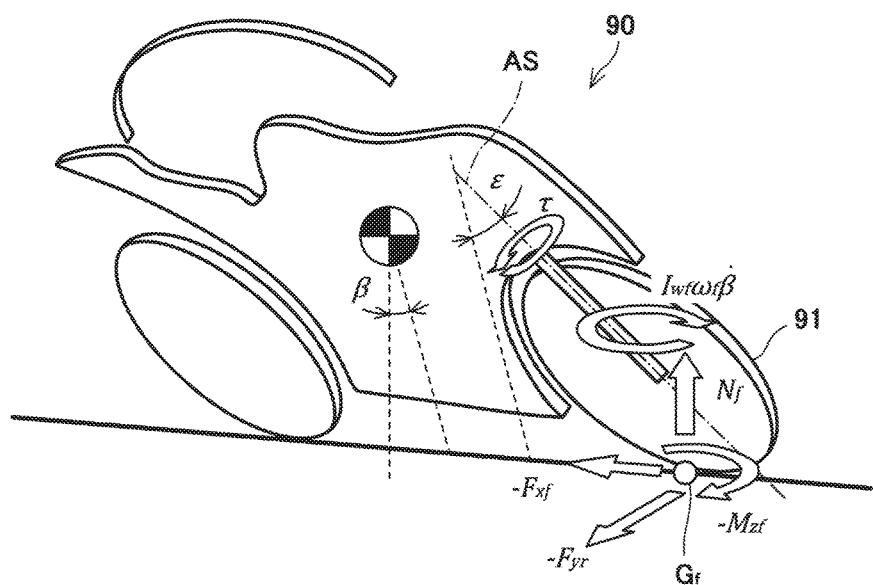
FIG. 3 is a conceptual view showing steering torque and torque components of the steering torque.

With reference to FIGS. 1 and 3, in the present example, as one of the plurality of the components of the steering torque τ, (1) a first torque component $τ_1$ generated due to a gyro moment $I_{wf}ω_fβ•$ is assumed, the gyro moment $I_{wf}ω_fβ•$ occurring with a front wheel axle being a rotation axis A1 (see FIG. 3) and the rotation axis of a vehicle body bank motion being a whirl axis A2 (see FIG. 3). In addition, (2) a second torque component $τ_2$ generated due to a front wheel braking force $F_{xf}$ is assumed. Further, (3) a third torque component $τ_3$ generated due to the front wheel vertical force $N_f$ which is a force applied in the vertical direction from the ground surface to the front wheel, (4) a fourth torque component $τ_4$ generated due to the front wheel lateral force $F_{yf}$ which is a force applied in the lateral direction from the ground surface to the front wheel, and (5) a fifth torque component $τ_5$ generated due to a moment $M_{zf}$ (hereinafter will be referred to as "front twist moment $M_{zf}$") occurring around the vertical axis at the ground point $G_f$ of the tire of the front wheel, are assumed. The torque estimating section 11 estimates the components $τ_1$~$τ_5$, in a manner described later. After that, the torque estimating section 11 derives the steering torque τ according to an equation (1).

[Equation 1]

$$τ=τ_1+τ_2+τ_3+τ_4+τ_5 \quad (1)$$

Thus, in the present example, the steering torque τ is derived by adding up the first to fifth torque components $τ_1$~$τ_5$.

First Torque Component $τ_1$

Figure 4:
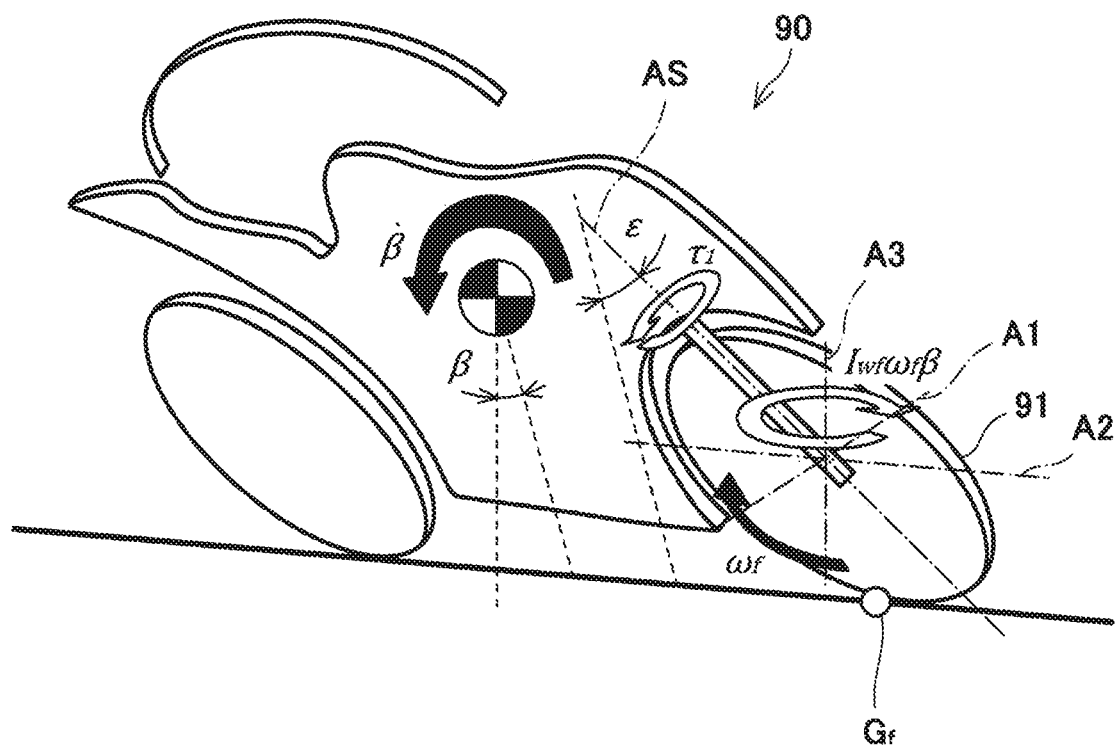
FIG. 4 is a conceptual view for explaining estimation of a first torque component.

FIG. 4 is a conceptual view for explaining the estimation of the first torque component $τ_1$. The torque estimating section 11 estimates the first torque component $τ_1$ based on the change over time of the bank angle 1β around the forward-rearward axis and the front wheel rotational speed ωf, and estimates the steering torque τ based on the estimated first torque component $τ_1$ according to the equation (1).

As described above, the first torque component $τ_1$ is the torque component provided to the steering axis AS by the gyro moment occurring with the front wheel axle being the rotation axis A1 and the rotation axis of the vehicle body bank motion being the whirl axis A2. To be precise, the rotation axis of the vehicle body bank motion is the "forward-rearward axis" extending in the forward and rearward direction and passing through the front wheel ground point $G_f$. In the present estimation, the whirl axis A2 is regarded as extending in the forward and rearward direction and being orthogonal to the front wheel axle. The gyro moment acts on a moment axis A3 which is orthogonal to the rotation axis A1 and the whirl axis A2. The steering axis AS is tilted (slanted rearward) by the caster angle ε with respect to the moment axis A3. In light of this, the torque estimating section 11 estimates the first torque component $τ_1$ according to an equation (2).

[Equation 2]

$$τ_1=I_{wf}ω_f\dot{β}\cos ε \quad (2)$$

$I_{wf}$ is an inertia moment of the front wheel. Note that the front wheel rotational speed ωf may be derived based on the vehicle speed. As represented by the equation (2), the first torque component $τ_1$ increases as the change over time of the bank angle β increases. For example, at the beginning and end of a turning operation, the first torque component $τ_1$ increases. Also, the first torque component $τ_1$ increases as the front wheel rotational speed, namely, the vehicle speed increases. Therefore, in a case were a rapid tilt change occurs while the vehicle is traveling at a high speed, great steering torque is generated based on the gyro moment.

Second Torque Component $\tau_2$

Figure 5:
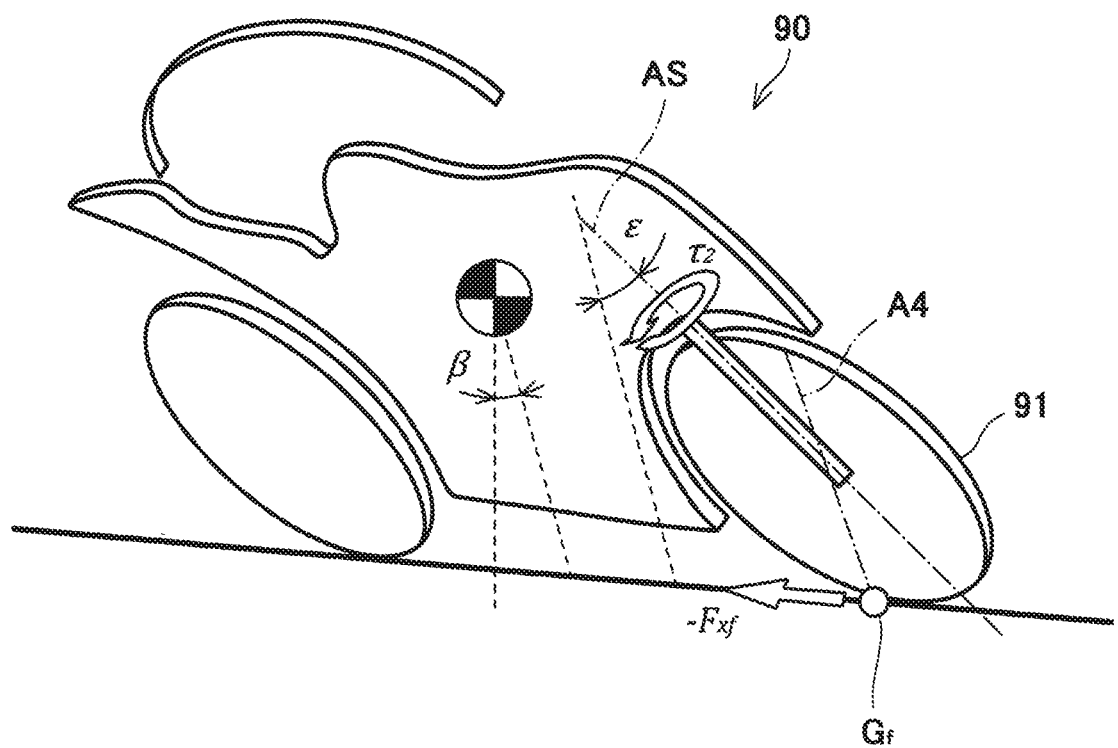
FIG. 5 is a conceptual view for explaining estimation of a second torque component.

FIG. 5 is a conceptual view for explaining the estimation of the second torque component $\tau_2$. The torque estimating section 11 estimates the second torque component $\tau_2$ based on the braking force applied to the front wheel, and estimates the steering torque $\tau$ based on the estimated second torque component $\tau_2$ according to the equation (1).

As described above, the braking force applied to the front wheel is substantially proportional to the front wheel brake pressure $P_f$. This braking force corresponds to the front wheel forward-rearward force $F_{xf}$ which is the force applied in the forward and rearward direction from the ground surface to the front wheel at the front wheel ground point $G_f$ (see equation (4)). The steering axis AS is tilted (slanted rearward) by the caster angle $\varepsilon$ with respect to the axis A4 of the moment generated based on the front wheel forward-rearward force $F_{xf}$. When the vehicle body is banked, the front wheel ground point $G_f$ at which the front wheel forward-rearward force $F_{xf}$ is generated is distant from the steering axis AS by the side trail $t_{side}$ (see FIG. 2B). The side trail $t_{side}$ follows an equation (5) in which the front wheel crown diameter $r_f$ is a constant and the bank angle $\beta$ is a variable.

The second torque component $\tau_2$ is the steering torque generated in a case where the braking force is generated at the front wheel ground point $G_f$ as the external force, due to a deviation (side trail $t_{side}$) between the front wheel ground point $G_f$ and the steering axis AS, the deviation occurring because of the bank state of the vehicle body. As the bank angle $\beta$ increases, the side trail $t_{side}$ increases, and the second torque component $\tau_2$ increases (see equations (3) and (5)). In the upright state (the bank angle $\beta$ is zero), the side trail $t_{side}$ is zero, and the second torque component $\tau_2$ is also zero. The torque estimating section 11 estimates the second torque component $\tau_2$ according to the equation (3), based on the braking force (the front wheel forward-rearward force $F_{xf}$) and the side trail $t_{side}$, and by taking the caster angle $\varepsilon$ into account.

[Equation 3]

$$\tau_2 = F_{xf} t_{side} \cos \varepsilon \qquad (3)$$

[Equation 4]

$$F_{xf} = K P_f \qquad (4)$$

[Equation 5]

$$t_{side} = r_f \sin \beta \qquad (5)$$

K is a proportional constant.

Figure 6:
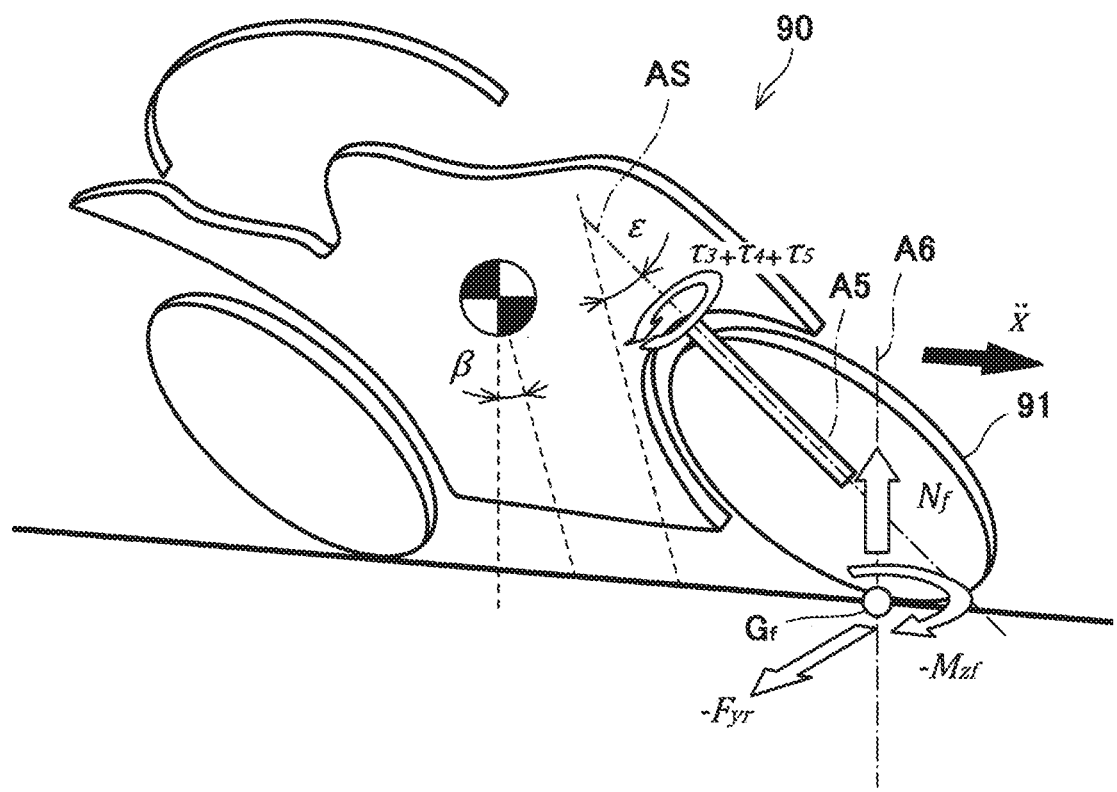
FIG. 6 is a conceptual view for explaining estimation of third to fifth torque components.

Third Torque Component $\tau_3$, Fourth Torque Component $\tau_4$, Fifth Torque Component $\tau_5$ FIG. 6 is a conceptual view for explaining estimation of the third to fifth torque components $\tau_3$ to $\tau_5$. The torque estimating section 11 estimates the third torque component $\tau_3$ based on the front wheel vertical force $N_f$, and estimates the steering torque $\tau$ based on the estimated third torque component $\tau_3$ according to the equation (1). The torque estimating section 11 estimates the fourth torque component $\tau_4$ based on the front wheel lateral force $F_{yf}$, and estimates the steering torque $\tau$ based on the estimated fourth torque component $\tau_4$ according to the equation (1). The torque estimating section 11 estimates the fifth torque component $\tau_5$ based on the front wheel lateral force $F_{yf}$ and the bank angle $\beta$, and estimates the steering torque $\tau$ based on the estimated fifth torque component $\tau_5$ according to the equation (1).

The torque estimating section 11 estimates the third torque component $\tau_3$ according to an equation (6), estimates the fourth torque component $\tau_4$ according to an equation (7), and estimates the fifth torque component $\tau_5$ according to an equation (8).

[Equation 6]

$$\tau_3 = f(\beta) N_f \qquad (6)$$

[Equation 7]

$$\tau_4 = g(\beta) F_{yf} \qquad (7)$$

[Equation 8]

$$\tau_5 = M_{zf} \cos \beta \cos \varepsilon \qquad (8)$$

Each of $f(\beta)$ and $g(\beta)$ is a function in which the bank angle $\beta$ is a variable. The front wheel vertical force $N_f$ and the front wheel lateral force $F_{yf}$ are applied from the ground surface to the front wheel at the front wheel ground point $G_f$. The front wheel ground point $G_f$ and the steering axis AS are apart from each other at a distance which depends on the side trail $t_{side}$ and the trail $t_{nor}$ (distance in the forward and rearward direction between the front wheel axle and the front wheel ground point $G_f$). The axis A5 of the moment acting based on the front wheel vertical force $N_f$, and the axis A5 of the moment acting based on the front wheel lateral force $F_{yf}$ are tilted by an angle corresponding to the bank angle $\beta$ or the caster angle $\varepsilon$, with respect to the steering axis. By introducing $f(\beta)$ and $g(\beta)$, the torque component $\tau_3$ based on the front wheel vertical force $N_f$ and the torque component $\tau_4$ based on the front wheel lateral force $F_{yf}$ can be estimated with accuracy, while taking this tilting into account. As in the second torque component $\tau_2$, the third torque component $\tau_3$ is the torque generated around the steering axis due to a deviation between the front wheel ground point and the steering axis, in a case where the vertical force as the external force is generated at the front wheel ground point. As in the second torque component $\tau_2$, the fourth torque component $\tau_4$ is the torque generated around the steering axis due to a deviation between the front wheel ground point and the steering axis, in a case where the lateral force as the external force is generated at the front wheel ground point.

$M_{zf}$ is the front twist torque which acts around a vertical axis A6 passing through the front wheel ground point $G_f$. The front twist torque $M_{zf}$ is affected by the characteristics of the vehicle body and the tire. The front twist torque $M_{zf}$ may be derived by use of, for example, a function or map obtained by an experiment. For example, the front twist torque $M_{zf}$ is set as a function of the slip angle $\alpha$ (see FIG. 2C). The value of the front twist torque $M_{zf}$ is set to a value varied depending on a change of the slip angle $\alpha$. The slip angle $\alpha$ is defined as the angle formed between the moving direction of the vehicle body and the direction of the front wheel, in a top plan view perpendicular to the vertical direction. In other words, the slip angle $\alpha$ is defined as the angle formed between the moving direction of the vehicle body and the direction perpendicular to the front wheel axle, in the top plan view perpendicular to the vertical direction. The slip angle $\alpha$ may be derived based on a detection value of the moving direction of the vehicle body and a detection value of the wheel angle. Without use of these detection values, the slip angle α may be derived theoretically. An inertia sensor may be used to detect the moving direction of the vehicle body. A steering angle sensor may be used to detect the direction of the front wheel. The front twist torque $M_{zf}$ may be a function in which the lateral force and the bank angle as well as the slip angle α are variables.

The torque estimating section 11 estimates the third torque component $\tau_3$ based on the front wheel vertical force $N_f$ estimated by the front wheel force estimating section 12. The torque estimating section 11 estimates the fourth torque component $\tau_4$ based on the front wheel lateral force $F_{yf}$ estimated by the front wheel force estimating section 12. Here, detailed description of the principle of estimation of the front wheel vertical force $N_f$ and the front wheel lateral force $F_{yf}$ is omitted. The front wheel force estimating section 12 estimates the front wheel vertical force $N_y$ and the front wheel lateral force $F_{yf}$ based on the bank angle β and the value (first-order temporal differentiation value β• of the bank angle, and second-order temporal differentiation value β•• of the bank angle) associated with the change over time of the bank angle β, by taking into account, a change over time of a vertical momentum and a change over time of a lateral motion state of the vehicle body within the plane perpendicular to the forward-rearward axis. By use of this estimating method, even in a case where the vertical force and the lateral force change by the change of the bank angle β, this change can be reflected on a result of the estimation. Therefore, in a transit state in which the bank angle β changes, the front wheel vertical force $N_y$ and the front wheel lateral force $F_{yf}$ can be estimated with accuracy. Also, the front wheel force is estimated by taking the forward-rearward acceleration rate x•• into account. This makes it possible to improve accuracy of estimating the dividing ratio between the front wheel force applied from the ground surface to the front wheel and the rear wheel force applied from the ground surface to the rear wheel. Since the accuracy of estimating the front wheel force can be improved, accuracy of estimating the third to fifth torque components $\tau_3$ to $\tau_5$ can also be improved. The vertical force and the lateral force may be derived theoretically in a geometric manner, or by use of, for example, a map obtained by an experiment.

The torque estimating section 11 estimates the first to fifth torque components $\tau_1$ to $\tau_5$, according to the equations (2), (3), (6), (7), and (8), respectively. The torque estimating section 11 estimates the steering torque τ based on the estimated five torque components $\tau_1$ to $\tau_5$, according to the equation (1).

In particular, in the present example, the bank motion is noted as the vehicle body behavior. The steering torque τ is estimated by taking into account, the torque (the first torque component $\tau_1$) provided to the steering axis AS due to the gyro effects produced at the front wheel by the bank motion. The first torque component $\tau_1$ is estimated by taking into account, the change over time of the bank angle β (in particular, bank angular velocity (the first-order temporal differentiation value of the bank angle β) β•), rather than the bank angle β. This makes it possible to estimate the steering torque τ with accuracy, under the transit state in which the bank angle β changes.

In the vehicle which turns in a state in which the vehicle body is tilted (inclined) around the forward-rearward axis, typically, the bank angle β changes at the beginning of the turning, in which the vehicle being traveling straight ahead begins to turn, and the end of the turning, in which the vehicle returns from the turning to the straight-ahead traveling. At the beginning of the traveling, typically, a deceleration operation, for example, an operation for braking the front wheel is performed.

In the present example, the steering torque τ is estimated by taking into account, the torque (the second torque component $\tau_2$) applied to the steering axis AS based on the front wheel forward-rearward force $F_{xf}$ applied in the forward and rearward direction from the ground surface to the front wheel at the front wheel ground point $G_f$ due to the braking force, in addition to the gyro effects. Therefore, in the transit state in which the front wheel is braked and the vehicle is decelerated, the steering torque τ can be estimated with accuracy. In particular, in a case where the steering torque τ is estimated by taking both of the first torque component $\tau_1$ and the second torque component $\tau_2$ into account, the steering torque τ which is naturally generated at the steering axis AS, in particular at the beginning of the turning in the transit state, can be estimated with accuracy.

The third to fifth torque components $\tau_3$ to $\tau_5$ are also estimated by taking the bank angle β into account. This makes it possible to improve accuracy of estimating the steering torque τ in the vehicle whose vehicle body is tilted (inclined or slanted) while the vehicle is turning.

The second to fifth torque components $\tau_2$ to $\tau_5$ are the torque components based on the forces $F_{xf}$, $N_f$, and $F_{yf}$, respectively, applied from the ground surface to the front wheel. The second to fifth torque components $\tau_2$ to $\tau_5$ are estimated by taking into account, a distance from the location (specifically, the front wheel ground point $G_f$) at which the forces $F_{xf}$, $N_f$, and $F_{yf}$ are applied to the front wheel, to the steering axis AS, the distance being defined based on the bank angle β. This makes it possible to improve accuracy of estimating the steering torque τ in the vehicle whose vehicle body is tilted while the vehicle is turning.

The estimated value of the steering torque τ which is highly accurate can be utilized for various purposes such as a vehicle control and vehicle development/design assist. In a case where the steering torque estimating device 1 is mounted in the vehicle, the steering torque τ can be quickly estimated after the vehicle body information (the bank angle β, the vehicle speed x• or the like) are detected. Therefore, it becomes possible to execute a control for the driving power or the braking force in response to the steering torque generated at real time, based on the estimated steering torque τ while the vehicle is traveling.

Thus far, the embodiment of the present invention has been developed. The above-described embodiment can be changed, added or deleted within the scope of the invention.

The above-shown equations are exemplary, and may be different by taking other influences into account. For example, terms which affect other elements may be added, terms which affect less the steering torque are reduced, or compensation coefficient which makes the value of the steering torque close to an actual measurement result may be included in the equation. For example, the steering torque may be derived by adding a gravitational moment and a centrifugal moment of a steered unit which is steered together with the wheel by the steering operation. Nonetheless, the estimation of the steering torque τ by taking the first to fifth torque components $\tau_1$ to $\tau_5$ into account provides advantages because the first to fifth torque components $\tau_1$ to $\tau_5$ affect more the steering axis AS than the torque based on the gravitational moment and the centrifugal force.

Regarding the estimation of the first torque component $\tau_1$, information having a correlation with the rotational speed of the front wheel, the correlation allowing estimation of known information or a trend of the rotational speed of the front wheel, may be used as the rotational speed information of the front wheel, instead of the rotational speed of the front wheel. For example, in a case where a front wheel diameter is known, the rotational speed of the front wheel may be obtained based on the front wheel diameter and the vehicle body speed.

Regarding the estimation of the third to fifth torque components $\tau_3$ to $\tau_5$, the vertical force and the lateral force may be estimated by use of measurement values instead of the estimated values. The vertical force and the lateral force for each vehicle state may be measured, and the steering torque may be estimated based on the vehicle state with reference to a map of the measurement values of the vertical force and the lateral force. The vertical force and the lateral force may be derived approximately based on the vehicle state having a trend associated with the vertical force and the lateral force.

Although the steering torque estimating device 1 is mounted in the vehicle, it may be located outside the vehicle. For example, information unique to the vehicle, such as the inertia moment, may be obtained or stored, information corresponding to the rotational speed of the front wheel and information corresponding to the change of the bank angle may be obtained from the vehicle during or after the traveling, and the steering torque of the vehicle being traveling may be estimated. For example, the steering torque estimating device 1 may be a dedicated processor unit different from an in-vehicle ECU. For example, the steering torque estimating device 1 may be a processor unit disposed outside the vehicle and including a communication section which can receive the vehicle information transmitted from the vehicle body.

In the estimation of the second to fifth torque components $\tau_2$ to $\tau_5$, an equation (formula) may be set by taking the influences of steering into account. Specifically, the equation may be compensated based on the steering angle of the steering axis. For example, in a case where the steering axis is steered so that the front wheel is directed to a side toward which the vehicle body is tilted, the equation may be compensated so that the side trail is reduced Further, the present invention includes a case where the elements which affect less the steering torque are omitted.

The steering torque estimating device 1 may be realized by a controller for an engine control which is mounted in the vehicle body. For example, the steering torque estimating device 1 may be realized by, for example, a controller for braking used in ABS, or a controller used in a meter display control. Thus, the steering torque estimating device 1 may be realized by a device which is capable of calculations which is mounted in the vehicle.

Although in the above-described example, both of the first torque component $\tau_1$ and the second torque component $\tau_2$ are estimated, the present invention includes a case where one of the first torque component $\tau_1$ and the second torque component $\tau_2$ is estimated. For example, the steering torque $\tau$ may be estimated by adding at least one of the first torque component $\tau_1$ and the second torque component $\tau_2$, preferably, both of the first torque component $\tau_1$ and the second torque component $\tau_2$, in addition to base torque component attributed to the tire force applied from the ground surface to the wheel. Further, the base torque component may be obtained by, for example, an experiment, instead of the above-described method. The present invention includes a case where the steering torque is estimated based on the base torque component obtained by the experiment, by taking at least one of the first torque component $\tau_1$ and the second torque component $\tau_2$ into account.

The present invention includes manual estimation. The steering torque $\tau$ need not be estimated automatically by the calculations performed by the processor unit.

The present invention can be suitably used in the estimation of tire forces of a vehicle other than the motorcycle, which can turn in a bank state. For example, the tire forces of a vehicle including a plurality of front or rear wheels, for example, a three-wheeled vehicle including two front wheels, can be estimated. Further, the present invention is applicable to the estimation of the tire forces of a bicycle or monocycle to which a rider gives a driving force.

REFERENCE CHARACTERS LIST 1 steering torque estimating device
11 torque estimating section

The invention claimed is:

1. A steering torque estimating device which estimates steering torque which is torque provided to a steering axis due to a vehicle body behavior, in a vehicle including a front wheel as a steered wheel, the vehicle being configured to turn in a bank state in which a vehicle body is tilted around a forward-rearward axis, the steering torque estimating device comprising:
   a torque estimating section which estimates the steering torque based on a change over time of a bank angle and a rotational speed of the front wheel.

2. The steering torque estimating device according to claim 1,
   wherein the torque estimating section estimates the steering torque based on a braking force applied to the front wheel.

3. The steering torque estimating device according to claim 2,
   wherein the torque estimating section estimates the steering torque based on a distance from a location at which a force applied to the front wheel is generated, to the steering axis, the distance being defined based on a bank angle.

4. The steering torque estimating device according to claim 1,
   wherein the torque estimating section estimates the steering torque based on a front wheel vertical force which is a force applied in a vertical direction from a ground surface to the front wheel.

5. The steering torque estimating device according to claim 1,
   wherein the torque estimating section estimates the steering torque based on a front wheel lateral force which is a force applied in a lateral direction from a ground surface to the front wheel.

6. The steering torque estimating device according to claim 1,
   wherein the torque estimating section estimates the steering torque based on a slip angle which is a deviation angle of a direction of the front wheel with respect to a moving direction of the vehicle body.

7. A steering torque estimating device which estimates steering torque which is torque provided to a steering axis due to a vehicle body behavior, in a vehicle including a front wheel as a steered wheel, the vehicle being configured to turn in a bank state in which a vehicle body is tilted around a forward-rearward axis, the steering torque estimating device comprising:
   a torque estimating section which estimates the steering torque based on a force applied from a ground surface to the front wheel, and a distance from a location at which the force applied to the front wheel is generated, to the steering axis, the distance being defined based on a bank angle.

8. A method of estimating steering torque which is torque provided to a steering axis due to a vehicle body behavior, in a vehicle including a front wheel as a steered wheel, the vehicle being configured to turn in a bank state in which a vehicle body is tilted around a forward-rearward axis, the method comprising:

estimating the steering torque based on a change over time of a bank angle around the forward-rearward axis and a rotational speed of the front wheel.

9. The method of estimating steering torque according to claim 8, comprising:

estimating the steering torque based on a force applied from a ground surface to the front wheel, and a distance from a location at which the force applied to the front wheel is generated, to the steering axis, the distance being defined based on a bank angle.

* * * * *